(12) United States Patent
Kolpasky

(10) Patent No.: US 7,262,689 B2
(45) Date of Patent: Aug. 28, 2007

(54) COMBINED VEHICLE DISPLAY AND METHOD

(75) Inventor: Kevin G. Kolpasky, Sterling Heights, MI (US)

(73) Assignee: General Motors Corporation, Detroit, MI (US)

( * ) Notice: Subject to any disclaimer, the term of this patent is extended or adjusted under 35 U.S.C. 154(b) by 642 days.

(21) Appl. No.: 10/755,801

(22) Filed: Jan. 12, 2004

(65) Prior Publication Data

US 2005/0154502 A1 Jul. 14, 2005

(51) Int. Cl.
*B60Q 1/00* (2006.01)

(52) U.S. Cl. ............... 340/461; 340/438; 340/441; 340/459; 340/688; 362/23; 362/487; 362/488; 362/489

(58) Field of Classification Search .......... 340/461, 340/438, 441, 459, 688; 362/23, 27, 487, 362/488, 489
See application file for complete search history.

(56) References Cited

U.S. PATENT DOCUMENTS

| | | | |
|---|---|---|---|
| 4,835,537 A * | 5/1989 | Manion | 342/30 |
| 4,841,902 A | 6/1989 | Gubin | 116/62.4 |
| 5,018,087 A | 5/1991 | Dannenberg | 364/571.01 |
| 5,269,187 A | 12/1993 | Hanson | 73/495 |
| 5,437,185 A | 8/1995 | Panzica | 73/493 |
| 5,523,922 A | 6/1996 | Kato | 362/23 |
| 5,815,072 A | 9/1998 | Yamanaka et al. | 340/461 |
| 6,310,544 B1 | 10/2001 | Cohen | 340/438 |
| 6,667,726 B1 * | 12/2003 | Damiani et al. | 345/1.1 |
| 6,762,696 B2 * | 7/2004 | Hulverscheidt et al. | 340/995.2 |
| 6,778,095 B2 * | 8/2004 | Lo | 340/815.78 |
| 2003/0011470 A1 | 1/2003 | Cohen | 340/425.5 |

* cited by examiner

*Primary Examiner*—Benjamin C. Lee
*Assistant Examiner*—Travis R. Hunnings

(57) ABSTRACT

A display for a vehicle includes an indicator such as a pointer or needle. The display is configured such that (1) the position of the indicator is responsive to, and thus indicative of, a first measurable vehicle characteristic; and (2) the appearance of the indicator is responsive to, and thus indicative of, a second measurable vehicle characteristic. In a preferred embodiment, the first measurable characteristic is vehicle speed and the second measurable characteristic is engine speed so that the display functions as a combined speedometer and tachometer. A corresponding method is also provided.

18 Claims, 1 Drawing Sheet

COMBINED VEHICLE DISPLAY AND METHOD

TECHNICAL FIELD

This invention relates to vehicle displays having an indicator, the position of which indicates the value of a first measurable vehicle characteristic and the appearance of which is indicative of the value of a second measurable vehicle characteristic.

BACKGROUND OF THE INVENTION

Vehicles typically include a plurality of displays for conveying information about the vehicle, including its components, to a driver. For example, vehicles typically include a speedometer that indicates the speed of the vehicle to a driver. Prior art speedometers are typically gauges with markings expressing a range of vehicle speeds and a movable pointer. The position of the pointer with respect to the markings indicates vehicle speed. Vehicles often employ a tachometer to indicate engine speed. Prior art tachometers are also typically gauges with markings and a movable pointer.

Modern vehicles convey a significant amount of information to a driver regarding the status of the vehicle and its component systems. However, informational displays take up limited space in an instrument panel and limit the design of the cockpit.

SUMMARY OF THE INVENTION

A display for a vehicle having at least two measurable characteristics is provided. The display includes a movable indicator; the position of the indicator is responsive to, and thus indicative of, a first measurable vehicle characteristic. The appearance of the indicator is responsive to, and thus indicative of, a second measurable vehicle characteristic different from the first measurable vehicle characteristic. The display of the invention conveys the same amount of information as two prior art displays. For example, the first measurable characteristic may be vehicle speed and the second measurable characteristic may be engine speed. The display would thus function as both a speedometer and a tachometer, eliminating the need for separate tachometer and speedometer gauges. The elimination of separate tachometer and speedometer gauges improves upon the prior art by (1) providing more room in an instrument panel for other informational displays or to increase the size of displays, and (2) enabling smaller instrument panels compared to the prior art.

In an exemplary embodiment, a first segment of the indicator alters the color it displays in response to the engine operating above a first predetermined speed, and a second segment of the indicator adjacent to the first segment alters the color it displays in response to the engine operating above a second predetermined speed. The indicator would then function like a bar graph, where the quantity of adjacent segments whose displayed color has been altered increases with engine speed.

A corresponding method for indicating values of a plurality of measurable vehicle characteristics is also provided. The method includes moving an indicator in response to a first vehicle characteristic, and changing the appearance of the indicator in response to the second vehicle characteristic.

The above features and advantages, and other features and advantages, of the present invention are readily apparent from the following detailed description of the best mode for carrying out the invention when taken in connection with the accompanying drawings.

DESCRIPTION OF THE PREFERRED EMBODIMENT

Figure 1:
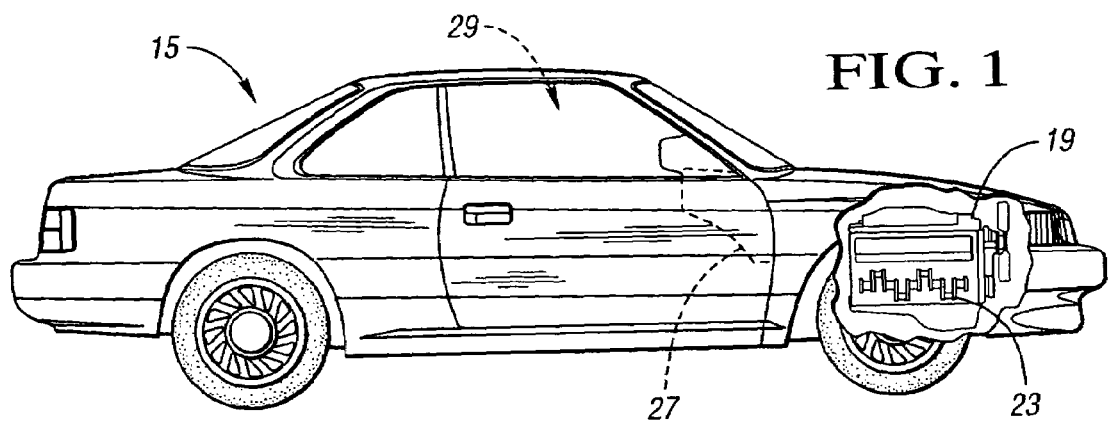
FIG. 1 is a schematic partial cutaway side view of a vehicle including an engine.

Referring to FIG. 1, a vehicle 15 having an engine 19 is schematically depicted. The engine 19 has a rotatable crankshaft 23. An instrument panel 27 in a passenger compartment 29 informs a driver (not shown) of various operating states and conditions of the vehicle, including vehicle velocity with respect to the surface on which the vehicle is traveling (vehicle speed), and the angular velocity of the crankshaft 23, referred to hereinafter as "engine speed."

Figure 2:
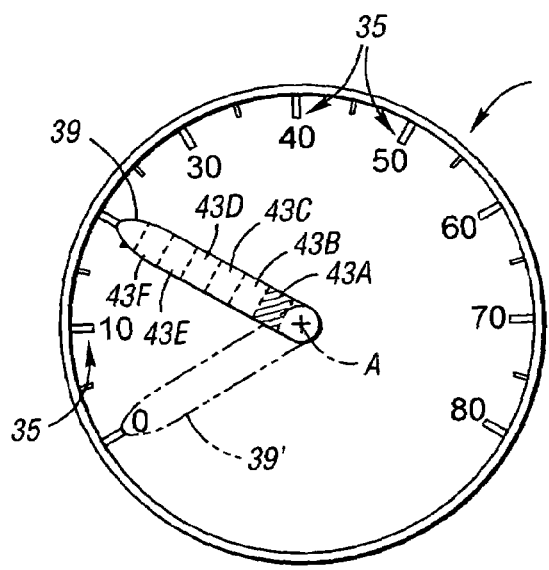
FIG. 2 is a schematic front view of a display with a pointer, the position of which indicates the speed of the vehicle of FIG. 1, and the appearance of which indicates the speed of the engine of FIG. 1.

FIG. 2 schematically depicts a display 31 on the instrument panel 27 of FIG. 1. The display 31 includes markings 35, such as numbers, to represent various vehicle speeds. The display 31 also includes an elongated pointer 39, or needle, movable with respect to the markings 35; the pointer 39 functions as an indicator whose position with respect to the markings 35 is indicative of vehicle velocity.

More specifically, the pointer 39 is rotatable about axis A. When the vehicle is at rest, i.e., vehicle velocity is zero, the pointer is in an initial position (shown in phantom at 39') in which the pointer points to a marking representing zero. The angular displacement of the pointer from the initial position is directly proportional to vehicle speed. The pointer 39 indicates that the vehicle speed is approximately 20 miles per hour (mph) in FIG. 2.

The appearance of at least a portion of the pointer 39 is variable in response to engine speed so that the appearance of the pointer 39 provides some indication of engine speed to a driver. In the embodiment depicted, the pointer 39 has seven portions, or segments 43A-F, that alter appearance in response to engine speed. The segments are spaced along a portion of the length of the pointer 39. In the context of the present invention, the "bottom" of the pointer 39 is that portion of the pointer proximate to the axis A of rotation. The "top" of the pointer is that portion of the pointer at the distal end from the axis A. Accordingly, a segment that is "higher" than another segment is closer to the "top" of the pointer. Segment 43A is the segment most proximate to the axis A of rotation of the pointer; segment 43F is the segment most distant from the axis A. Segments 43B-E are arranged between segment 43A and segment 43F such that segment 43B is higher than segment 43A, segment 43C is higher than segment 43B, segment 43D is higher than segment 43C, and segment 43E is higher than segment 43D.

Each of segments 43A-F is, i.e., displays, a respective initial color. In the present embodiment, the respective initial color of each segment is white. However, within the scope of the claimed invention, the initial color of each segment may or may not be the same. Each segment 43A-F changes or alters the color it displays from its respective initial color in response to the engine speed exceeding a predetermined amount. To avoid the need for color drawings, the different colors are schematically represented by different cross-hatching patterns in the Figures. The predetermined engine speed amount at which a segment changes color is dependant upon the distance of the segment from the axis A: the farther a segment is from the axis, the higher the predetermined engine speed at which the segment displays a color different from its respective initial color. In the context of the present invention, a change in color of a segment includes a change in hue, saturation, or brightness of the segment. A change in color may be the result of changes to the reflective characteristics of the segment, illumination of the segment (i.e., light emitted from or through the segment), etc.

Segment 43A has changed the color it displays from its initial color to green in FIG. 2 to indicate that the engine is operating at a speed greater than a first predetermined amount. For example, the first predetermined amount may be the engine's idle speed so that segment 43A is always green when the engine is running.

Figure 3:
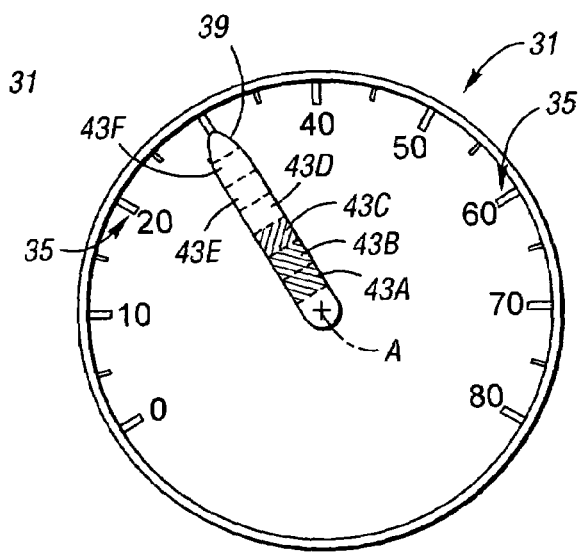
FIG. 3 is a schematic front view of the display of FIG. 2 with the pointer having a plurality of segments colored differently than in FIG. 2.

Referring to FIG. 3, wherein like reference numbers refer to like components from FIG. 2, segment 43B has changed from its initial color to green to indicate that the engine speed exceeds a second predetermined amount greater than the first predetermined amount, such as 2500 rpm. Segment 43C has changed from its initial color to yellow to indicate that the engine speed exceeds a third predetermined amount greater than the second predetermined amount, such as 3500 rpm. Segments 43D-F are their respective initial colors, indicating that the engine is operating between the third predetermined amount and a fourth predetermined amount at which segment 43D changes to a color different from its initial color. The pointer 39 has moved from its position in FIG. 2 to indicate that the vehicle speed is approximately 30 miles per hour.

Figure 4:
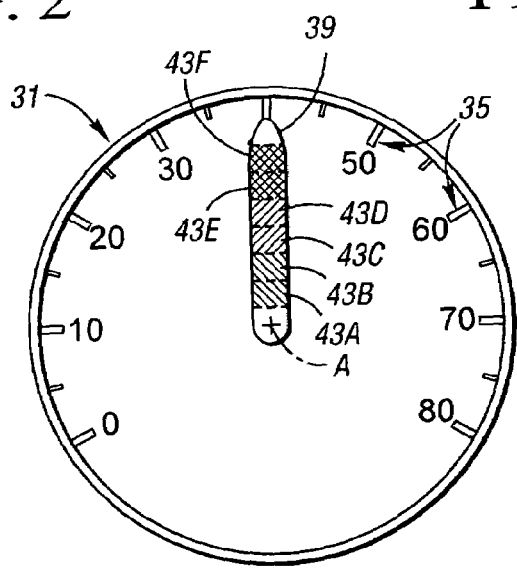
FIG. 4 is a schematic front view of the display of FIGS. 1 and 2 with the pointer having yet more segments differently colored.

Referring to FIG. 4, segment 43D has changed from its initial color to yellow to indicate that the engine is operating at a speed greater than the fourth predetermined amount. Segments 43E and 43F have changed from their respective initial colors to red to indicate that the engine is operating above a fifth and a sixth predetermined amount, respectively.

It may be desirable for the display to include numerical markings (not shown) on the pointer to provide more information to a vehicle driver. For example, a number indicating the predetermined engine speed at which a segment changes color may be adjacent to the segment.

The appearance of the pointer 39 indicates engine speed in two ways. First, the quantity of segments that have changed from their respective initial colors reflects engine speed. If the upper segment, i.e., segment 43F, changes color when the engine is operating at or near its maximum capacity, then a driver can estimate the percentage of the maximum speed at which the engine is operating by the percentage of segments that have altered color.

Second, the specific colors displayed on the pointer indicate the engine speed to a driver. In the embodiment depicted, only green is displayed when the engine speed is at or below the third predetermined amount. Similarly, only yellow and green are displayed when the engine speed is at or below the fifth predetermined amount. Red is displayed only when the engine speed is higher than the fifth predetermined amount.

Although the appearance of the pointer in the preferred embodiment indicates engine speed in two ways, i.e., by the quantity of segments that have changed from their initial color, and by the specific colors displayed, the appearance of the pointer may also indicate engine speed in only one way within the scope of the claimed invention. For example, the color displayed by only one portion of the pointer may change in response to engine speed; the one portion may be green when the engine speed is in a low range, yellow in a higher engine speed range, and red when the engine speed is above the redline.

In the embodiment depicted, the position of the pointer indicates vehicle speed and the appearance of the pointer indicates engine speed. However, within the scope of the claimed invention, the display could indicate any two measurable characteristics of the vehicle. For example, the display may be configured such that the position of the pointer indicates vehicle speed, and the appearance of the pointer indicates fuel level.

The display 31 may take a variety of forms within the scope of the claimed invention. For example, the display may be mechanical, with the markings 35 printed on a dial face, and the pointer may be connected to a geared stepping motor. LEDs may form part of the pointer, i.e., placed on or within the pointer; the LEDs would be controlled to selectively illuminate, and thereby cause segments of the pointer to change color in response to engine speed. Alternatively, and within the scope of the claimed invention, a "pointer" or "indicator" may be an image of a pointer or indicator, such as on a computer-controlled liquid crystal display (LCD). Similarly, "markings" may also be images on a screen.

While the best mode for carrying out the invention has been described in detail, those familiar with the art to which this invention relates will recognize various alternative designs and embodiments for practicing the invention within the scope of the appended claims.

The invention claimed is:

1. A display for a vehicle having a first measurable characteristic and a second measurable characteristic, the display comprising:
   a movable, elongated indicator; wherein the display is connectable to the vehicle such that the position of the indicator indicates the value of the first measurable characteristic, and the appearance of the indicator is variable to indicate the value of the second measurable characteristic;
   wherein the indicator is configured to display a first color and a second color; wherein the indicator displays the first color and not the second color in response to the value of the second measurable characteristic being at or below a first predetermined amount; and wherein the indicator displays the second color in response to the value of the second measurable characteristic being above the first predetermined amount.

2. The display of claim 1, wherein the indicator is configured to display a third color; wherein the indicator does not display the third color in response to the value of the second measurable characteristic being at or below a second predetermined amount greater than the first predetermined amount; and wherein the indicator displays the third color in response to the value of the second measurable characteristic being above the second predetermined amount.

3. A display for a vehicle having a first measurable characteristic and a second measurable characteristic, the display comprising:
   a movable, elongated indicator; wherein the display is connectable to the vehicle such that the position of the indicator indicates the value of the first measurable characteristic, and the appearance of the indicator is variable to indicate the value of the second measurable characteristic;

wherein the indicator is movable about an axis; wherein the indicator is characterized by a plurality of segments, including a lower segment and an upper segment, the upper segment being more distant from the axis than the lower segment;

wherein the lower segment and the upper segment each display a respective initial color when the value of the second measurable characteristic is below a first predetermined amount;

wherein the lower segment displays a first color different from its respective initial color, and the upper segment displays its respective initial color, in response to the value of the second measurable characteristic being greater than the first predetermined amount and less than a second predetermined amount; and wherein the lower segment displays the first color and the upper segment displays a second color different from its respective initial color in response to the value of the second measurable characteristic being above the second predetermined amount.

4. The display of claim 3, wherein the second color is different from the first color.

5. A display for a vehicle having a first measurable characteristic and a second measurable characteristic, the display comprising:

a movable, elongated indicator; wherein the display is connectable to the vehicle such that the position of the indicator indicates the value of the first measurable characteristic, and the appearance of the indicator is variable to indicate the value of the second measurable characteristic;

wherein the vehicle has an engine characterized by a variable engine speed, wherein the first measurable characteristic is vehicle speed, and wherein the second measurable characteristic is engine speed.

6. The display of claim 5, wherein the indicator is configured to display a first color and a second color; wherein the indicator displays the first color and not the second color in response to the engine speed being at or below a first predetermined amount; and wherein the indicator displays the second color in response to the engine speed being above the first predetermined amount.

7. The display of claim 6, wherein the indicator is configured to display a third color; wherein the indicator does not display the third color in response to the engine speed being at or below a second predetermined amount greater than the first predetermined amount; and wherein the indicator displays the third color in response to the engine speed being above the second predetermined amount.

8. The display of claim 7, wherein the first color is green, the second color is yellow, and the third color is red.

9. The display of claim 5, wherein the indicator is movable about an axis; wherein the indicator is characterized by a plurality of segments, including a lower segment and an upper segment more distant from the axis than the lower segment;

wherein the lower segment and the upper segment each display a respective initial color when the engine speed is below a first predetermined amount;

wherein the lower segment displays a first color different from its respective initial color, and the upper segment displays its respective initial color, in response to the engine speed being greater than the first predetermined amount and less than a second predetermined amount; and wherein the lower segment displays the first color and the upper segment displays a second color different from its respective initial color in response to the engine speed being above the second predetermined amount.

10. The display of claim 9, wherein the second color is different from the first color.

11. A vehicle comprising:

an engine characterized by a variable engine speed; and a display including a movable, elongated indicator, the position of which indicates vehicle speed; and wherein the color displayed by at least a portion of the indicator is variable to indicate engine speed.

12. The vehicle of claim 11, wherein the indicator is configured to display a first color and a second color; wherein the indicator displays the first color and not the second color in response to the engine speed being at or below a first predetermined amount; and wherein the indicator displays the second color in response to the engine speed being above the first predetermined amount.

13. The vehicle of claim 12, wherein the indicator is configured to display a third color; wherein the indicator does not display the third color in response to the engine speed being at or below a second predetermined amount greater than the first predetermined amount; and wherein the indicator displays the third color in response to the engine speed being above the second predetermined amount.

14. The vehicle of claim 13, wherein the first color is green, the second color is yellow, and the third color is red.

15. The vehicle of claim 11, wherein the indicator is movable about an axis; wherein the indicator is characterized by a plurality of segments, including a lower segment and an upper segment more distant from the axis than the lower segment;

wherein the lower segment and the upper segment each display a respective initial color when the engine speed is below a first predetermined amount;

wherein the lower segment displays a first color different from its respective initial color, and the upper segment displays its respective initial color, in response to the engine speed being greater than the first predetermined amount and less than a second predetermined amount; and wherein the lower segment displays the first color and the upper segment displays a second color different from its respective initial color in response to the engine speed being above the second predetermined amount.

16. The vehicle of claim 15, wherein the second color is different from the first color.

17. A method for indicating values of a plurality of measurable characteristics of a vehicle having an engine characterized by a selectively variable engine speed, the method comprising:

moving an indicator in response to a variation in the speed of the vehicle; and changing the appearance of at least a portion of the indicator in response to a variation in the engine speed.

18. A display for a vehicle having an engine characterized by a variable engine speed, the display comprising:

a plurality of markings representing vehicle speeds; and an elongated indicator rotatable about an axis;

wherein the display is connectable to the vehicle such that the position of the indicator with respect to the plurality of markings is indicative of the speed of the vehicle;

wherein the indicator is characterized by a plurality of segments, including a lower segment proximate to the axis, an upper segment more distant from the axis than the lower segment, and a middle segment between the upper and lower segments; and wherein the indicator is configured such that the lower, middle, and upper segments each display an initial color when the engine speed is below a first predetermined amount; and the lower segment displays a first color different from its respective initial color only in response to the engine speed exceeding a first predetermined amount, the middle segment displays a second color different from its respective initial color only in response to the engine speed exceeding a second predetermined amount greater than the first predetermined amount, and the upper segment displays a third color different from its respect initial color only in response to the engine speed exceeding a third predetermined amount greater than the second predetermined amount.

* * * * *